(12) United States Patent
Hanzawa et al.

(10) Patent No.: US 7,882,735 B2
(45) Date of Patent: Feb. 8, 2011

(54) THERMAL AIR FLOWMETER

(75) Inventors: Keiji Hanzawa, Mito (JP); Yoshihiko Akagi, Hitachinaka (JP); Takuto Okamoto, Hitachinaka (JP); Kohei Suseki, Yokohama (JP); Takeshi Morino, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 12/769,291

(22) Filed: Apr. 28, 2010

(65) Prior Publication Data

US 2010/0275685 A1 Nov. 4, 2010

(30) Foreign Application Priority Data

Apr. 30, 2009 (JP) ............................. 2009-111254

(51) Int. Cl.
G01F 1/68 (2006.01)
(52) U.S. Cl. ................................... 73/204.25
(58) Field of Classification Search ............... 73/204.25, 73/204.24, 204.23
See application file for complete search history.

(56) References Cited

U.S. PATENT DOCUMENTS

| | | | |
|---|---|---|---|
| 4,649,745 A * | 3/1987 | Kondo et al. ............. | 73/114.34 |
| 5,186,045 A | 2/1993 | Matsuoka et al. | |
| 5,817,932 A * | 10/1998 | Nishimura et al. ....... | 73/114.34 |
| 6,851,311 B2 | 2/2005 | Nakada et al. | |
| 7,269,999 B2 * | 9/2007 | Nakano et al. ............. | 73/202.5 |
| 7,565,255 B2 * | 7/2009 | Kanke et al. ................ | 702/100 |
| 7,631,555 B2 * | 12/2009 | Nakano et al. ........... | 73/204.15 |
| 2009/0222231 A1 | 9/2009 | Berger et al. | |

FOREIGN PATENT DOCUMENTS

| | |
|---|---|
| DE | 10 2005 025 884 A1 12/2006 |
| EP | 0 961 105 A1 12/1999 |
| JP | 11-351938 A 12/1999 |
| JP | 2003-185481 A 7/2003 |
| JP | 2008-2833 A 1/2008 |

OTHER PUBLICATIONS

European Search Report Sep. 20, 2010 (Three (3) pages).

* cited by examiner

*Primary Examiner*—Jewel Thompson
(74) *Attorney, Agent, or Firm*—Crowell & Moring LLP

(57) ABSTRACT

An object of the invention is to provide a thermal air flowmeter which can reduce a detection error occurring during pulsating air flow due to a difference of response between rising and falling of detected flow or due to air flow dependence of response. A thermal air flowmeter 1 includes a heat-generating resistor 7 which heats liquid, a heating drive circuit 5 which causes current to flow in the heat-generating resistor 7 and thereby controls heating of the heat-generating resistor 7, and a temperature-sensitive resistor 9 which detects a temperature of the fluid heated by the heat-generating resistor 7. The thermal air flowmeter 1 detects a flow Q of the liquid based on the amount of heat of the liquid heated by the heat-generating resistor 7. Further included are: flow correction value calculating means 17 which calculates a flow correction value ca based on a variation dQ/dt of the detected flow Q and on a flow correction coefficient a set dependent on the detected flow Q; and flow correction means 18 which corrects the detected flow Q based on the flow correction value ca.

6 Claims, 10 Drawing Sheets

THERMAL AIR FLOWMETER

BACKGROUND OF THE INVENTION

1. Field of the Invention

The present invention relates to thermal air flowmeters which measure a flow of gas (air), and more particularly to a thermal air flowmeter suitable for detecting a flow of air sucked into the engine of an automobile.

2. Background Art

Examples of conventional flowmeter for air sucked into the engine of an automobile include: a system, as described in JP Patent Publication (Kokai) No. 2003-185481 A, which detects a heating control current value of a heat-generating resistor and converts the value into a flow of air; and a system which detects, as a temperature difference signal, a thermal effect on temperature-sensitive resistors arranged upstream and downstream of a heating register and captures the signal as a voltage of a bridge circuit.

Further, JP Patent Publication (Kokai) No. 11-351938 A (1999) proposes an approach which applies separate corrections to rising and falling characteristics with respect to an output response appearing in a thermal air flowmeter and thereby reduces a response difference occurring in the detection element.

SUMMARY OF THE INVENTION

However, in actual vehicle environments in which these thermal air flowmeters are installed and used, there occurs a pulsating air flow synchronized with the rotating speed of engine. In such a non-steady state, also, the detected air flow average value must correspond to a flow of air actually sucked into the engine; but an error may occur due to the following factors.

(1) Response delay dependent on thermal capacitance of a detection element
(2) Response difference between rising and falling of flow
(3) Response depending on air flow because of the amount of heat transmitted from the detection element to air depending on air flow Factor (1) depends on the size and thermal insulation of the detection element, but there are limits to the extent of downsizing. Thus response delay occurs to no small extent.

Factor (2) has been addressed by the above conventional example. However, with only this measure, the pulsing phenomenon in the actual engine cannot be properly captured.

Factor (3) has not been addressed.

In this way, in thermal air flowmeters, due to a response difference between rising and falling of flow or to air flow dependence of the response, there occurs an error of flow (detected flow) detected during pulsating air flow. In such a non-steady state, in order to control the engine with high accuracy, the detected air flow average value must correspond to a flow of air actually sucked into the engine.

Thus, to solve the above problems, the present invention has been devised and has an object to provide a thermal air flowmeter which can reduce a detection error occurring during pulsating air flow due to a response difference between rising and falling of detected flow or to air flow dependence of the response.

To address the above problems, a thermal air flowmeter according to the present invention includes a heat-generating resistor which heats fluid; a heating drive circuit which causes current to flow in the heat-generating resistor and thereby controls heating of the heat-generating resistor; and a temperature-sensitive resistor which detects a temperature of the fluid heated by the heat-generating resistor. The thermal air flowmeter has a basic structure which detects a flow of fluid based on the amount of heat of the fluid heated by the heat-generating resistor; and attention is focused on a method that calculates a flow correction value based on at least the detected flow and a (temporal) variation of the detected flow and corrects the detected flow by use of the flow correction value. The thermal air flowmeter has at least any one of the following features.

The thermal air flowmeter according to a first invention is characterized by calculating the flow correction value based on a temporal variation of the detected flow and on a flow correction coefficient set according to the detected flow.

The thermal air flowmeter according to a second invention is characterized by transforming the value of the detected flow into a non-linear form by use of a transform factor dependent on the value of the detected flow and calculating the flow correction value based on a temporal variation of the transformed detected flow.

The thermal air flowmeter according to a third invention is characterized by calculating the flow correction value by use of an arithmetic expression including a term of temporal variation of the detected flow and a term of differentiation of second or higher order using time of the detected flow as a variable.

With the inventive thermal air flowmeters, in an engine system having a large pulsating air flow, an air flow can be accurately detected. Further, an air flow can be acquired without impairing the reliability of the detection element while a high response is achieved and also the detected waveform is hardly distorted.

BRIEF DESCRIPTION OF THE DRAWINGS

FIG. 7(A) is a waveform chart when the detected flow is varied stepwise; FIG. 7(B) is a waveform chart showing an output of a response compensations filter 60 in the state of FIG. 7(A); and FIG. 7(C) is a waveform chart showing a waveform after correction of the detected flow when the response compensations filter 60 showed in FIG. 7(B) is used.

DETAILED DESCRIPTION OF THE PREFERRED EMBODIMENTS

The inventive thermal air flowmeter will be described with reference to the drawings showing some embodiments thereof.

First Embodiment

Figure 1:
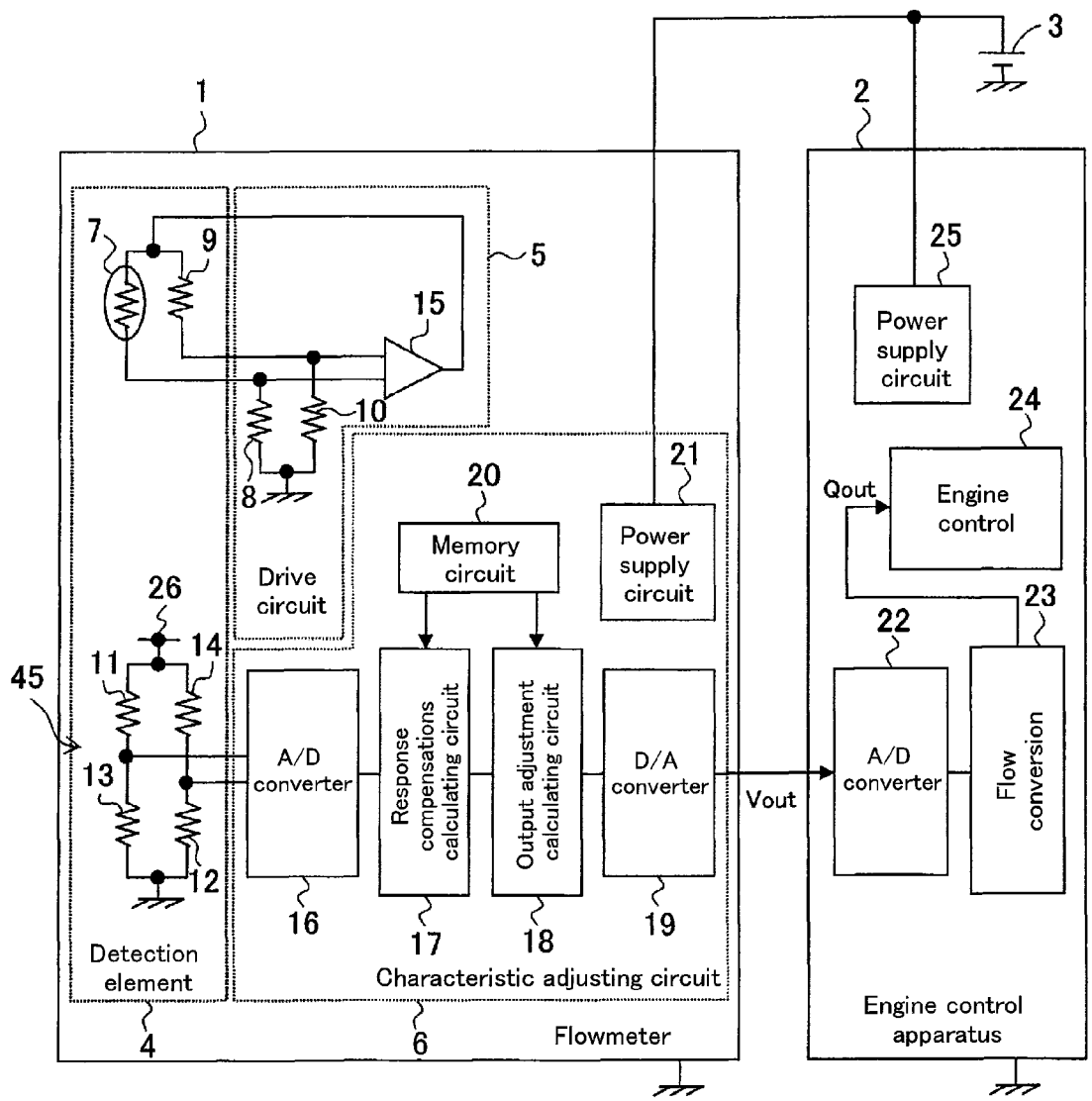
FIG. 1 is a view illustrating a configuration of an air flow measuring system with a thermal air flowmeter according to a first embodiment.

FIG. 1 is a view illustrating a configuration of an air flow measuring system with a thermal air flowmeter according to the present embodiment. The air flow measuring system includes an air flowmeter (thermal air flowmeter) 1, an engine control apparatus 2 and a power supply 3 which drives these apparatuses. The thermal air flowmeter 1 includes a flow detecting element 4 which detects an air flow and converts the air flow into an electric signal, a drive circuit (heating drive circuit) 5 which causes current to flow in a heater resistor (heat-generating resistor) 7 and thereby controls heating of the heat-generating resistor, and a characteristic adjusting circuit (flow calculating means) 6 which corrects the electric signal detected by the flow detecting element 4 so that constant input-output characteristics are provided.

The flow detecting element 4 includes the heater resistor (heat-generating resistor) 7 and a non-heated resistor (temperature-sensitive resistor) 9; and these resistors are connected to the drive circuit 5. When current is supplied from the drive circuit 5 described later to the heater resistor 7, the heater resistor 7 generates heat so that fluid (air) around the resistor 7 is heated to at least a temperature higher than the ambient air temperature. The non-heated resistor 9 is used to detect a temperature of fluid heated by the heater resistor 7; and heating of the heater resistor 7 is controlled by the drive circuit 5 so that the detected temperature has a constant value.

The flow detecting element 4 further includes temperature sensors (temperature detecting resistors) 11 and 12 arranged near a downstream side of the heater resistor 7 and temperature sensors (temperature detecting resistors) 13 and 14 arranged near a upstream side of the heater resistor 7; and these are connected through a constant voltage power supply 26, constituting a bridge circuit 45.

The drive circuit 5 includes fixed resistors 8 and 10 and a differential amplifier 15 arranged in the inner side of the drive circuit 5, and constitutes a heater control circuit which controls heating of the heater resistor 7. Current from the differential amplifier 15 is supplied to the heater resistor 7 by the drive circuit 5, and heating of the heater resistor 7 is controlled based on a detected temperature of the non-heated resistor 9 so that the heating temperature of the heater resistor 7 has a constant value relative to the ambient air (fluid) temperature.

In this way, based on a variation from the equilibrium state of the bridge circuit 45, a variation (the amount of heat) of temperature distribution of fluid caused by the heater resistor 7 between the temperature sensors is detected as a flow (detected flow Q) of fluid. When the flow of air varies, a variation of thermal effect exerted on the temperature sensors by the heater resistor is captured, whereby a voltage signal dependent on air flow and direction is acquired.

Figure 2:
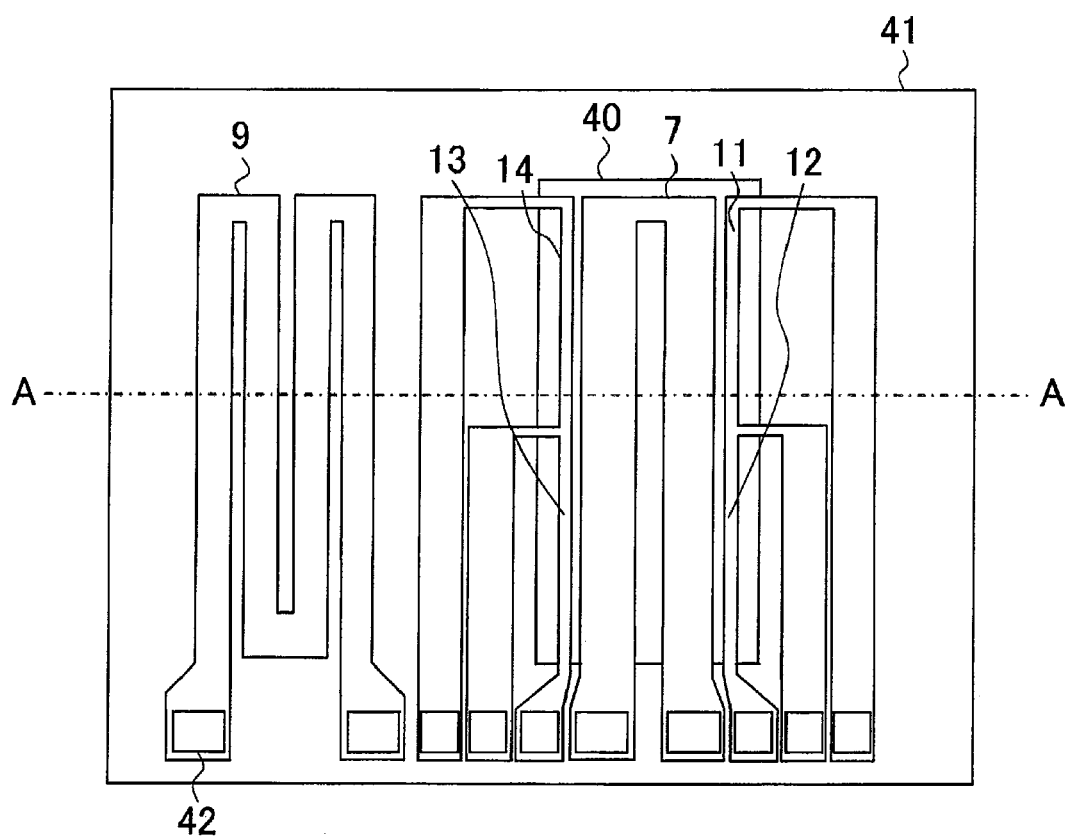
FIG. 2 is a plan view of a flow detecting element illustrated in FIG. 1.
Figure 3:
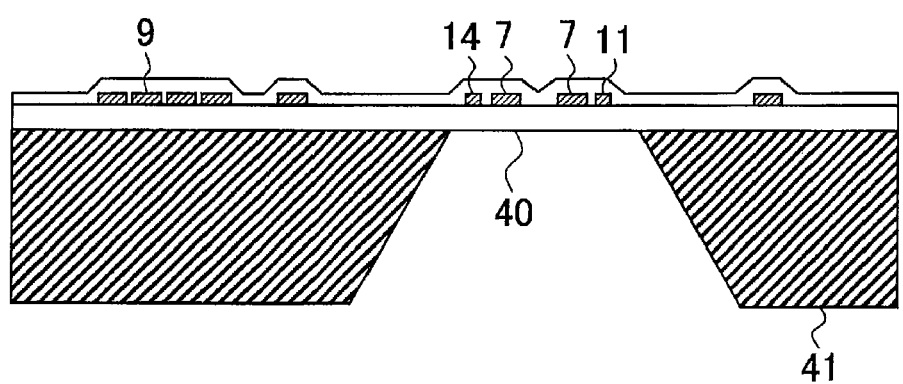
FIG. 3 is a cross-sectional view of the flow detecting element illustrated in FIG. 2.

FIG. 2 is a plan view of the flow detecting element 4; and FIG. 3 is a cross-sectional view of the flow detecting element 4. The heater resistor 7 has a folded shape of oblong resistor, and the temperature sensors 11, 12, 13 and 14 are arranged in both sides thereof.

The heater resistor 7 and the temperature sensors 11, 12, 13 and 14 are etched from the rear surface of a silicon substrate 41, for example, and are arranged in a diaphragm structure unit 40 having a small thermal capacity. The non-heated resistor 9 is arranged in a place which is hardly affected in temperature by heating of the heater resistor 7. These parts are connected through, for example, a gold wire bonding to a wiring portion 42 so as to be electrically connected to the circuit section. Further, the places in which the patterns of the temperature sensors 11, 12, 13 and 14 and the non-heated resistor 9 are arranged have a greatest thickness. According to the present embodiment, a potential at the center of the bridge constituted of the temperature sensors 11, 12, 13 and 14 is supplied to the characteristic adjusting circuit 6.

The characteristic adjusting circuit 6 is used to correct the electric signal (detected flow) detected by the flow detecting element 4 to calculate a flow, and includes an analog/digital converter circuit 16, a response compensations calculating circuit 17, an output adjustment calculating circuit 18 and a digital/analog converter circuit 19.

The analog/digital converter circuit 16 reads a voltage value dependent on flow and converts the voltage value into a digital value, which is outputted to the response compensations calculating circuit (flow correction value calculating means) 17. The response compensations calculating circuit 17 calculates a flow correction value used to compensate the response of the sensors (the processing will be described in detail later). Thereafter, in the output adjustment calculating circuit (flow correction means) 18, the detected flow is corrected based on the flow correction value so that the detected flow Q is corrected, and the corrected flow are adjusted to specific input-output characteristics. The adjusted digital value is converted into an analog signal by the digital/analog converter circuit 19; thereafter, the analog signal is outputted as an output signal Vout of the thermal air flowmeter 1 to the engine control apparatus 2.

The characteristic adjusting circuit 6 further includes: a memory circuit 20 used to store compensation data and adjustment data for calculations by the response compensations calculating circuit 17 and the output adjustment calculating circuit 18; and a power supply circuit 21 which supplies power to the above described circuits.

The output signal Vout of the thermal air flowmeter 1 is sent to an analog/digital converter circuit 22 in the engine control apparatus 2 and converted into a digital signal and then converted into a flow, whereby a flow signal Qout is acquired. An engine control calculating circuit 24 performs an arithmetic processing using this flow signal Qout, whereby an optimal fuel injection quantity is determined. The engine control apparatus 2 further includes a power supply circuit 25 which supplies power to the above described circuits.

Figure 4:
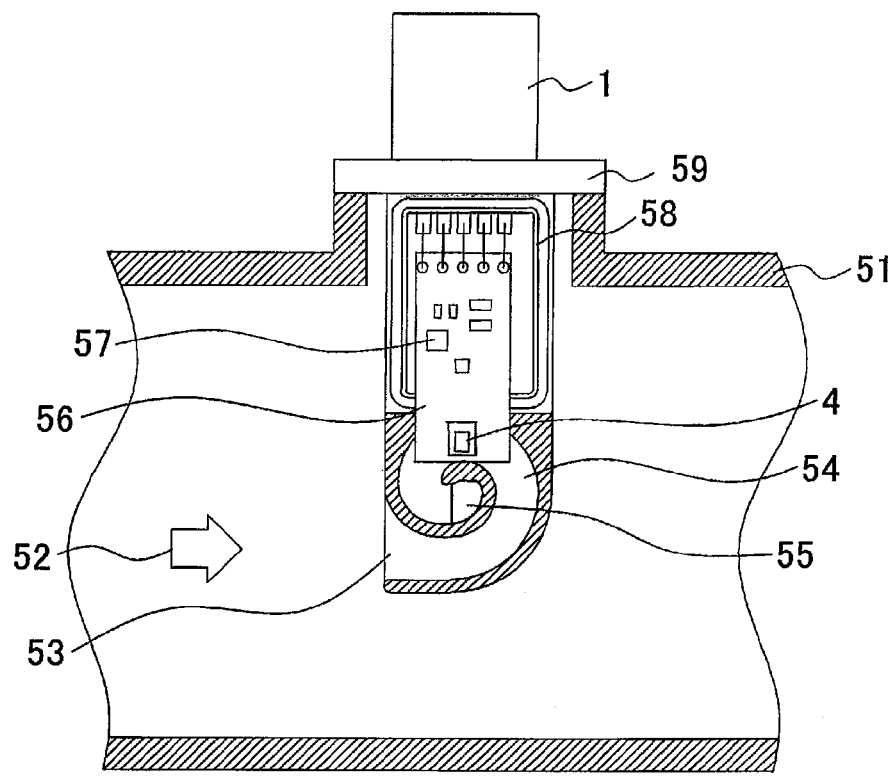
FIG. 4 is a schematic cross-sectional view showing a state in which the thermal air flowmeter according to the present embodiment is actually mounted and used in a vehicle.

FIG. 4 is a schematic cross-sectional view showing a state in which the thermal air flowmeter according to the present embodiment is actually mounted and used in a vehicle. The thermal air flowmeter 1 is mounted in a manner inserted in an air passage pipe (intake pipe) 51; and the thermal air flowmeter 1 is secured by a flange 59 to the air passage pipe 51.

A circuit substrate 56 having mounted thereon the flow detecting element 4 and circuit parts 57 is mounted in a housing 58 of the thermal air flowmeter 1. Airflow 52 flowing in the intake pipe is distributed through an air intake port 53 to the inner side of the thermal air flowmeter and passes through a bypass route 54 and then goes over the detection element 4 and is returned through a bypass exit 55 to the inner side of the main route pipe.

In such actual usage environment, a pulsing flow produced by the engine may affect detection characteristics of the thermal air flowmeter. Here, detection characteristics of the conventional thermal flowmeter will be briefly described below with reference to FIG. 5.

Figure 5:
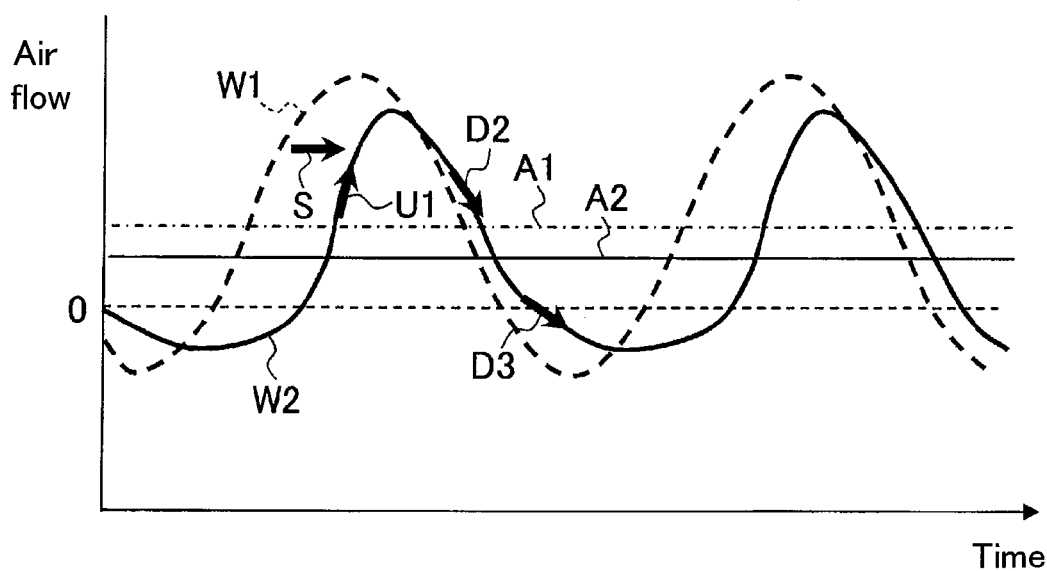
FIG. 5 is a view showing waveforms, during flow pulsation, of an actual air flow around the thermal air flowmeter in an actual usage state and of a flow detected by a conventional thermal air flowmeter.

FIG. 5 is a view showing comparison of waveforms during flow pulsation made between an actual air flow around the thermal air flowmeter in an actual usage state and a detected flow (flow signal Qout calculated in the above described engine control apparatus) detected by the conventional thermal air flowmeter.

Waveform W1 represents a real flow waveform, and waveform W2 represents a waveform of detected flow signal acquired from the output of the flowmeter. These illustrated waveforms indicate a case where a flow containing a pulsating air flow component pulsates so much that the flow becomes smaller than zero (that is, a reverse flow occurs instantaneously).

When such air flow is detected by the thermal air flowmeter, a signal like the waveform W2 is acquired due to a response delay. This signal waveform W2 is different from the waveform W1 being a real value not only in that the amplitude is smaller and the phase deviates.

More specifically, the first difference lies in that the rising part U1 of the waveform is steeper than the falling part D2 thereof which is a characteristic of the waveform. The reason for this difference lies in that the heating speed of the heater resistor 7 is not symmetrical with the heat radiation speed thereof. That is, the heater resistor 7 is heated by the drive circuit of the heater resistor 7 in the thermal air flowmeter, but the heater resistor 7 is, as described above, cooled down by heat radiation.

The second difference lies in that a difference of response exists between high flow and low flow; waveform part D3 of low flow is gentler than waveform part D2 of high flow and thus the response of low flow is more delayed than that of high flow. This is because the amount of heat dissipating from the heater resistor 7 depends on air flow; as the flow becomes low, heat dissipates less. Accordingly, a difference occurs between average value (average flow) A1 of the real flow signal waveform W1 and average value (average flow) A2 of the detected waveform W2 of the thermal air flowmeter; this difference creates a detection error.

Figure 6:
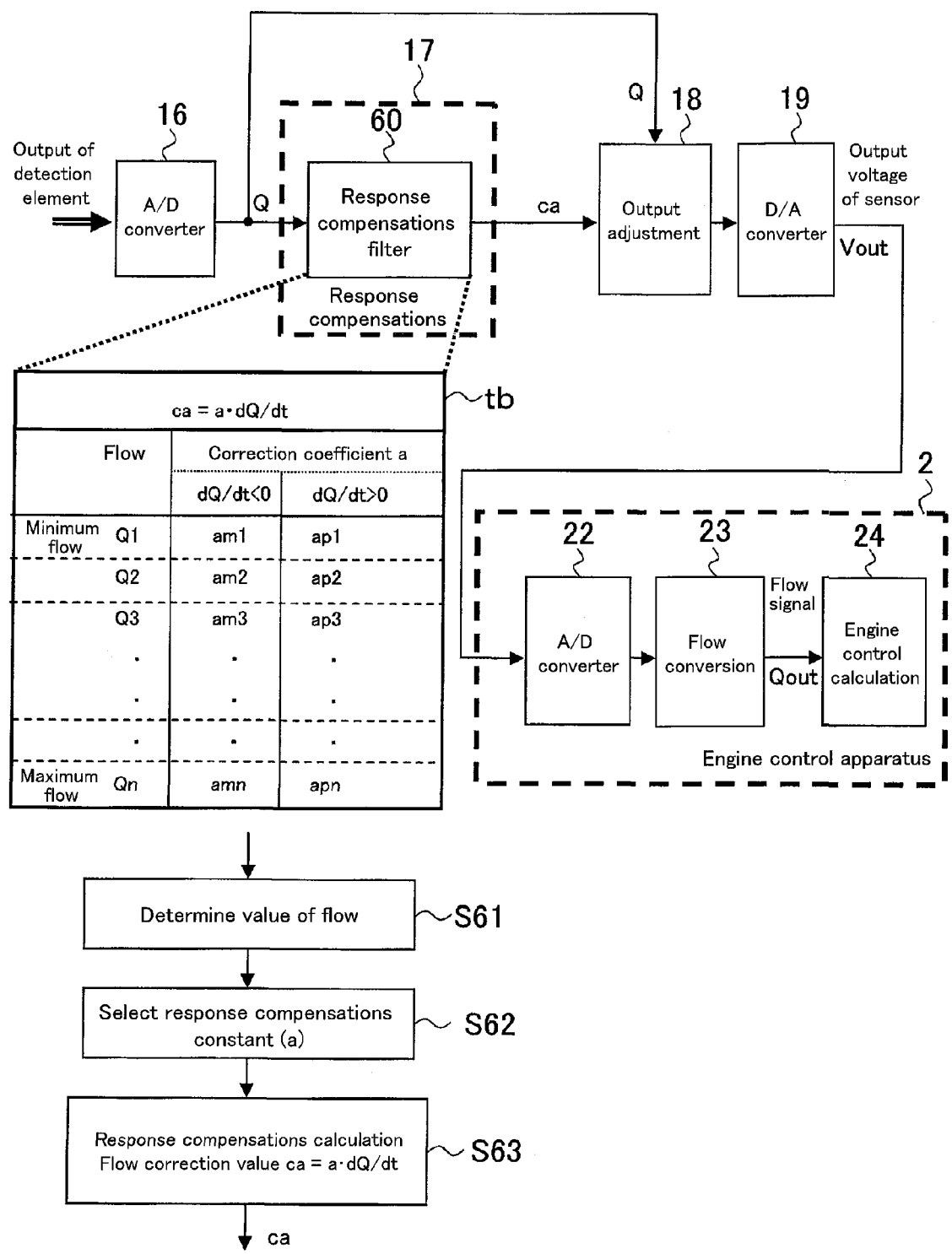
FIG. 6 is a block diagram illustrating a configuration of a characteristic adjusting circuit of the thermal air flowmeter illustrated in FIG. 1 and a configuration of an engine control apparatus, and a flowchart of a response compensations calculating circuit of the thermal air flowmeter illustrated in FIG. 1.

FIG. 6 is a block diagram illustrating a configuration of the characteristic adjusting circuit 6 of the thermal air flowmeter 1 illustrated in FIG. 1 and a configuration of the engine control apparatus 2 along with a flowchart of the response compensations calculating circuit of the thermal air flowmeter illustrated in FIG. 1. Here, an illustration of the memory circuit 20 and the power supply circuits 21 and 25 is omitted.

The response compensations calculating circuit 17 according to the present embodiment is constituted of a response compensations filter 60, in which when the symbol Q denotes an input signal (detected flow) converted from analog to digital form, the symbol a denotes a flow correction coefficient and the symbol dQ/dt denotes a temporal variation of the detected flow (a value obtained by differentiating the detected flow by using time as a variable), the flow correction coefficient a is multiplied by the temporal variation dQ/dt of the detected flow by use of an arithmetic expression for flow correction value, described below as formula (1), so that a flow correction value ca is calculated.

$$ca = a \times dQ/dt \tag{1}$$

In this way, the response compensations filter 60 calculates the flow correction value based on the temporal variation dQ/dt of the detected flow, i.e., based on a variation (temporal variation) obtained by applying differentiation of first order to the detected flow (input signal) using time as a variable. Thus, the detection response can be improved.

Also, this flow correction coefficient a is set according to the value of the flow signal (detected flow) Q. That is, data of the flow correction coefficient a is held in a correction table tb of the memory circuit 20 to allow a different constant to be selected according to increasing and decreasing of the detected flow Q and outputted to the response compensations filter 60.

In this correction table tb, data of the flow correction coefficient a dependent on the detected flow is, as illustrated in FIG. 6, held for both a case where the variation (dQ/dt) of the detected flow is positive (i.e., when the detected flow increases) and a case where the variation (dQ/dt) of the detected flow is negative (i.e., when the detected flow decreases). For example, when the variation of the detected flow is negative and the detected flow Q is smaller than Q2 and equal to or greater than Q1, the flow correction coefficient a is set to am1; and when the variation of the detected flow Q is positive and the detected flow Q is smaller than Q3 and equal to or greater than Q2, the flow correction coefficient a is set to ap2.

As illustrated in FIG. 6, irrespective of whether the variation (dQ/dt) of the detected flow is positive (i.e., the detected flow increases) or the variation (dQ/dt) of the detected flow is negative (i.e., the detected flow decreases), the flow correction coefficient (am1>am2> . . . >amn, ap1>ap2> . . . >apn) is set so that the flow correction coefficient a increases as the value (magnitude) of the detected flow Q becomes smaller. Accordingly, as will be described later, it is possible to suppress a greater response delay in low flow relative to high flow, which is a characteristic peculiar to the flow detecting element of the thermal air flowmeter.

Further, the flow correction coefficient is set so that, when the detected flow is in the same range, or have the same value, the flow correction coefficient in a case where the variation of the detected flow Q is positive (dQ/dt>0), is smaller than the flow correction coefficient in a case where the variation of the detected flow Q is negative (dQ/dt<0) (that is, am1>ap1, am2>ap2, . . . amn>apn). For example, the flow correction coefficient is set so that the flow correction coefficient ap2 for a case where the detected flow Q is smaller than Q2 and equal to or greater than Q1 and the variation of the detected flow Q is positive (dQ/dt>0), is smaller than the flow correction coefficient am2 for a case where the variation of the detected flow Q is negative (dQ/dt<0) (am1<ap1). Accordingly, as will be described later, it is possible to suppress a difference of response (response delay during falling) between rising and falling of the detected flow Q, which is a characteristic peculiar to the flow detecting element of the thermal air flowmeter.

The flow correction coefficient a is, as described above, set according to the detected flow; but the above flow correction coefficients may be set based on experiments or analyses so that the detected waveforms are made closer to waveforms of the real value, depending on the variation (rising and falling of waveform) of flow and the magnitude of flow.

Using this correction table tb, the flow correction value ca is calculated. More specifically, in step 61, as a compensations processing operation (flow correction value calculating processing), firstly a flow value determination processing is performed using a received flow signal (detected flow) Q and a variation signal of detected flow (variation of detected flow) dQ/dt; in the flow value determination processing, it is determined in which range the detected flow Q falls and whether the variation (temporal variation) of the detected flow Q is positive or negative.

Subsequently, in step 62, a response compensations constant (flow correction coefficient) prestored in the memory circuit 20 is selected according to the ranges of the flow signal Q1 (lowest flow) to the flow signal Qn (highest flow) and the flow variation signal (variation of flow) dQ/dt stored in the correction table tb.

For example, when the variation of the detected flow (dQ/dt) is negative (i.e., when the detected flow decreases) and the detected flow Q is smaller than Q2 and equal to or greater than Q1, then the value of am1 is selected as the flow correction coefficient a; when the detected flow Q is equal to or smaller than the highest flow Qn and equal to or greater than flow Qn−1, the value of amn is selected as the flow correction coefficient a. In this way, the compensations constant selecting processing is executed.

Thereafter, the operation proceeds to step 63, in which the response compensations calculating processing is executed (the flow correction value ca is calculated) based on the selected flow correction coefficient a and the variation of detected flow dQ/dt (more specifically, by multiplying these variables). Accordingly, the characteristic of the filter can be set so that the magnitude of response compensations varies according to the detected flow. Then, in the output adjustment calculating circuit 18, the detected flow Q is corrected based on the flow correction value ca (more specifically, the corrected flow Qa is calculated by adding the detected flow Q to the flow correction value ca.) With the above configuration, an optimum magnitude of response compensations can be set depending on the rising and falling of waveform and the value of flow.

Figure 7:
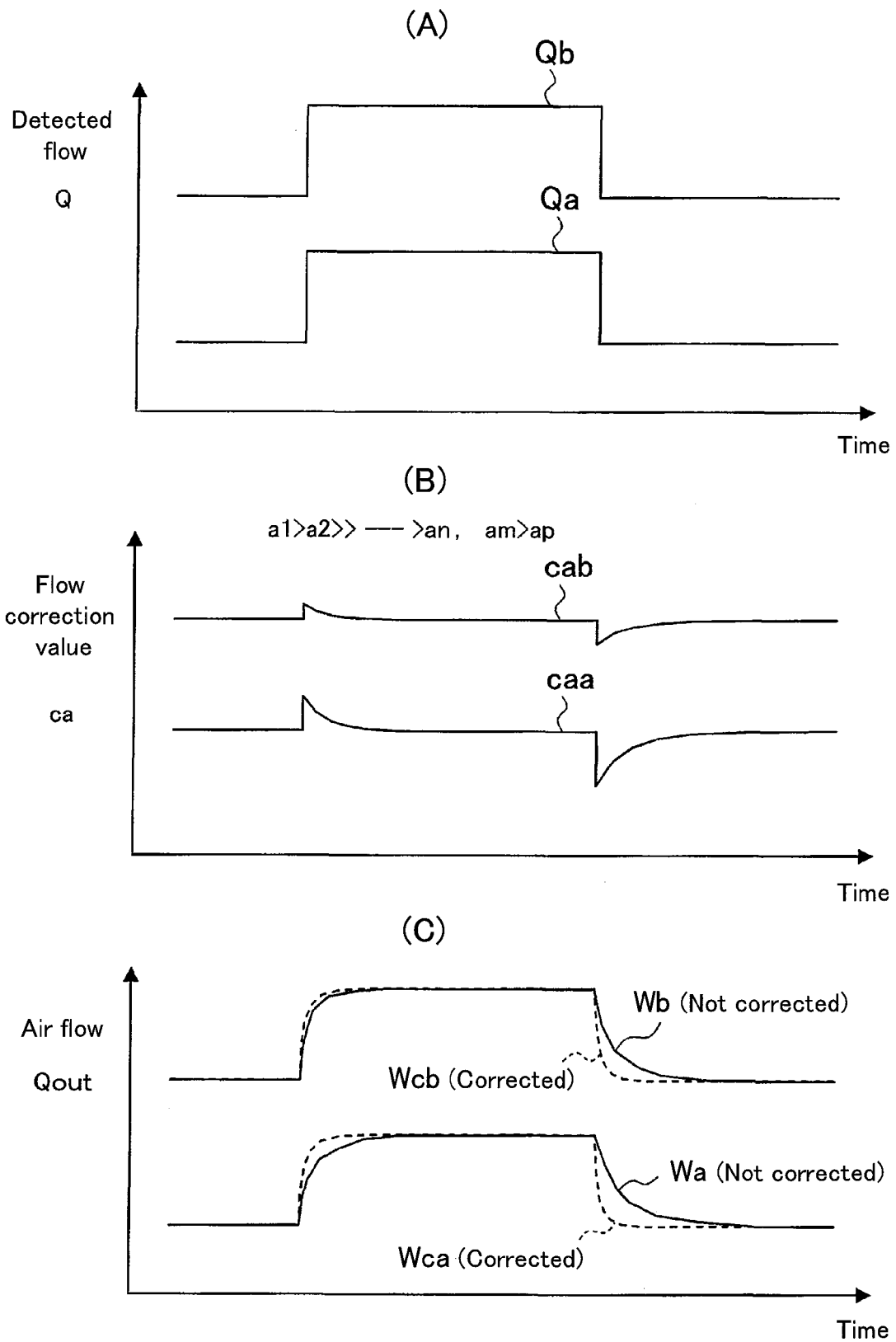
FIG. 7 is a view showing a step response characteristic of the response compensations calculating circuit according to the present embodiment.

FIG. 7 is a view showing a step response characteristic of the response compensations calculating circuit according to the present embodiment; FIG. 7(A) is a waveform chart when the input signal (detected flow) Q of the response compensations filter 60 is varied stepwise. Referring to FIG. 7(A), waveform Qa indicates a waveform of the step input signal in the lower flow side, and waveform Qb indicates a waveform of the step input signal in the higher flow side. The input signals having the same amplitude are supplied.

FIG. 7(B) shows an output of the response compensations filter 60 in the case of FIG. 7(A). As described above, in the correction table, the response compensations constant (flow correction coefficient) in the lower flow side is set greater and the response compensations constant (flow correction coefficient) in the higher flow side is set smaller, and the correction constant is set greater in falling than in rising. Thus, the waveform of the output value (flow correction value) ca after execution of the response compensations is a waveform caa in the lower flow side, and a waveform cab in the higher flow side; a different differential waveform is provided depending on the detected flow Q and the direction of variation of the detected flow.

FIG. 7(C) shows a waveform after correction of the detected flow when the response compensations filter shown in FIG. 7(B) is used. When the response compensations calculating circuit according to the present embodiment is not used, the detected waveform Qout is a waveform Wb in high flow, and a waveform Wa in low flow. In both the waveforms, a delay caused by a response delay of the flow detecting element is observed, and a difference in the magnitude of flow and a difference in rising and falling are also observed. However, when the response compensations calculating circuit according to the present embodiment is used to correct the detected flow, the detected waveform Qout is a waveform Wcb in high flow, and a waveform Wca in low flow; thus, as a result of improving the response, waveforms closer to the real-value waveforms Qa and Qb are acquired, not depending on the value of flow and the rising and falling of flow.

Figure 8:
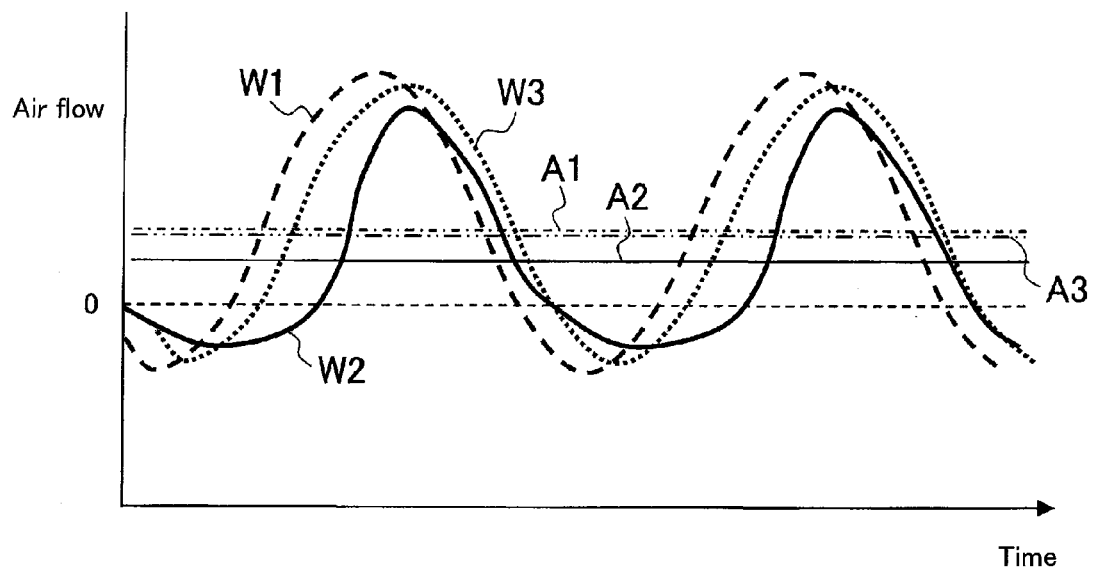
FIG. 8 is a waveform chart when the thermal air flowmeter according to the present embodiment is used in a state where the thermal air flowmeter is actually mounted in an engine.

FIG. 8 shows a waveform when the thermal air flowmeter according to the present embodiment is used in a state where the thermal air flowmeter is actually mounted in an engine. While the waveform of the real air flow is W1, the waveform of the detected flow Qout obtained by use of the conventional thermal air flowmeter is W2. However, when the thermal air flowmeter according to the present invention is used, the waveform of the detected flow Qout is W3; the response is improved and the distortion of waveform is also improved. As a result, the average value (average flow) A3 of the detected flow is closer to the average value A1 of the real air flow, allowing more accurate flow detection with little error in an actual usage state having a large flow pulsation, relative to the average value A2 with no correction.

According to the present embodiment, the response compensations filter constant (flow correction coefficient) is selected based on a combination of information on rising and falling of waveform and information on the air flow value (detected flow). However, it is clear that, when the flow correction coefficient is set and selected based only on the information on rising and falling of waveform, or when the flow correction coefficient is set and selected based only on the information on the air flow value so that the detected flow Q is corrected, a degree of advantage is achieved.

Figure 9:
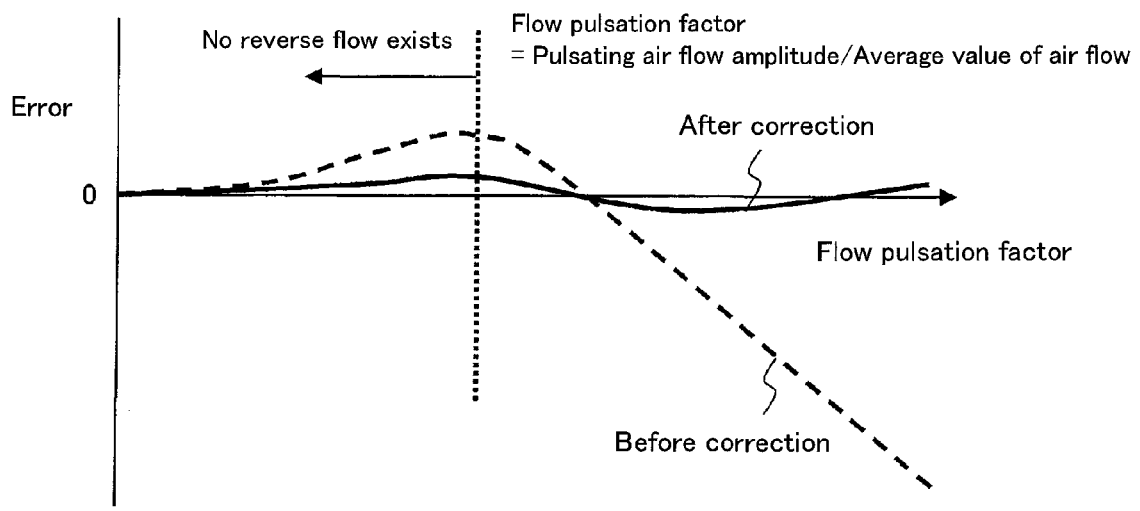
FIG. 9 is a view showing detected error characteristics of the air flowmeter relative to the magnitude of flow pulsation.

FIG. 9 is a view showing detected error characteristics of the air flowmeter relative to the magnitude of flow pulsation. The abscissa represents a flow pulsation factor indicating a ratio of the amplitude of flow pulsation to the average value of air flow, and the ordinate represents a difference between the average value of the real air flow and the average value of the air flow signal Qout calculated in the engine control apparatus based on the signal from the thermal air flowmeter. The region in the right side of FIG. 9 indicates a case where a larger flow pulsation exists; when a given value is exceeded, a reverse flow occurs. In the case of the real value, the value of error is zero, irrespective of the flow pulsation factor.

The flow pulsation error characteristic (not corrected) before execution of the response compensations according to the present embodiment varies, as indicated by the broken line, according to the flow pulsation factor and exhibits a large error, particularly in the higher-flow pulsation region. However, the characteristic (corrected) after execution of the response compensations according to the present embodiment exhibits, as a result of improving the detected waveform, little error in the region having a greater flow pulsation factor.

When the above configuration is used, an advantage is expected to be achieved in that errors dependent on various detected waveform distortions caused by the response or the heat radiation characteristics of the detesting element are reduced, and particularly the characteristic during large flow pulsation is significantly improved.

Figure 10:
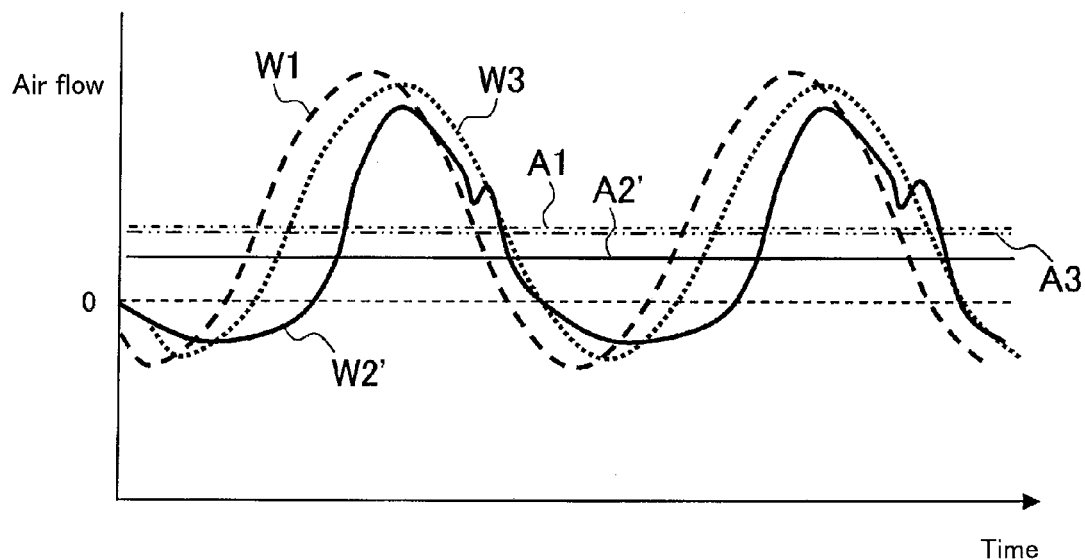
FIG. 10 is a waveform chart of the thermal air flowmeter when a slight disturbance of air flow occurs in a bypass route.

FIG. 10 is a waveform chart of the thermal air flowmeter when a slight disturbance of air flow occurs in a bypass route. When no correction is made, a disturbance occurs, as seen in the waveform W2 of flow, in the detected waveform of the flowmeter. In the case of such waveform having a disturbance, also, when an optimum flow correction coefficient by the response correction as illustrated in FIG. 6 is set and selected, and the flow correction value ca is calculated to correct the detected flow Q, then the waveform W3 is provided as the waveform of flow after execution of correction, and thus an more accurate value with little error is detected as the average flow A3.

Second Embodiment

Figure 11:
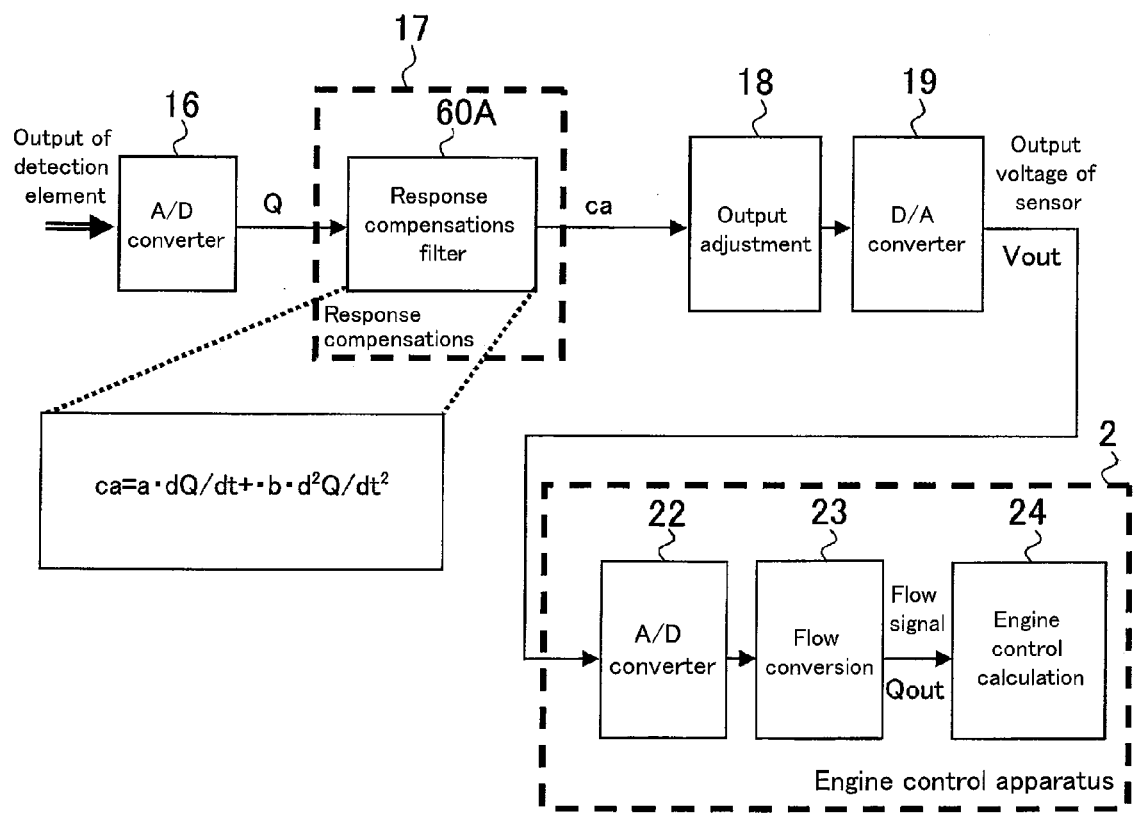
FIG. 11 is a block diagram illustrating a configuration of a characteristic adjusting circuit of a thermal air flowmeter according to a second embodiment and a configuration of an engine control apparatus.

FIG. 11 is a block diagram illustrating a configuration of a characteristic adjusting circuit of a thermal air flowmeter according to a second embodiment and a configuration of an engine control apparatus. Only the difference from the first embodiment will be described below, and a detailed explanation of the same configuration of the second embodiment as the first embodiment is omitted.

According to the present embodiment, in the configuration of the response compensations filter 60A, a table as used in the first embodiment is not used, but a differential equation of second order (arithmetic expression) is used which includes a term of a variation of the detected flow Q (differentiation of first order) and a term of differentiation of second order using time of the detected flow Q as the variable, whereby the flow correction value is calculated. More specifically, according to the present embodiment, the flow correction coefficient a is not set using the correction table as described in the first embodiment, but the flow correction coefficient a for the variation of the detected flow is set to a constant value, and instead the term of $b \times dQ^2/dt^2$ obtained by applying differentiation of second order to the detected flow using time as the variable is, as shown in formula (2), added to the arithmetic expression for the flow correction value. Here, b is a flow correction coefficient and has a constant value.

$$ca = a \times dQ/dt + b \times dQ^2/dt^2 \qquad (2)$$

An optimum value is preliminarily set to the flow correction coefficient a and b based on experiments or the like, so that flow dependence of the response compensations value (correction value) is implemented. When this response correction by this arithmetic expression is used, an advantageous effect is achieved by which the response compensations value can be varied according to the flow value while the memory capacity is reduced, thus allowing reduction of the detection error during flow pulsation.

According to the present embodiment, the flow correction values a and b are constant numbers; but the flow correction value a may be set, as described in the first embodiment, using the correction table tb based on the variation of the detected flow and the sign of temporal variation of the detected flow; in this case, the flow can be measured more accurately. Further, according to the present embodiment, it is clear that the calculation may be made using a formula including a term of differentiation of second or higher order.

Third Embodiment

Figure 12:
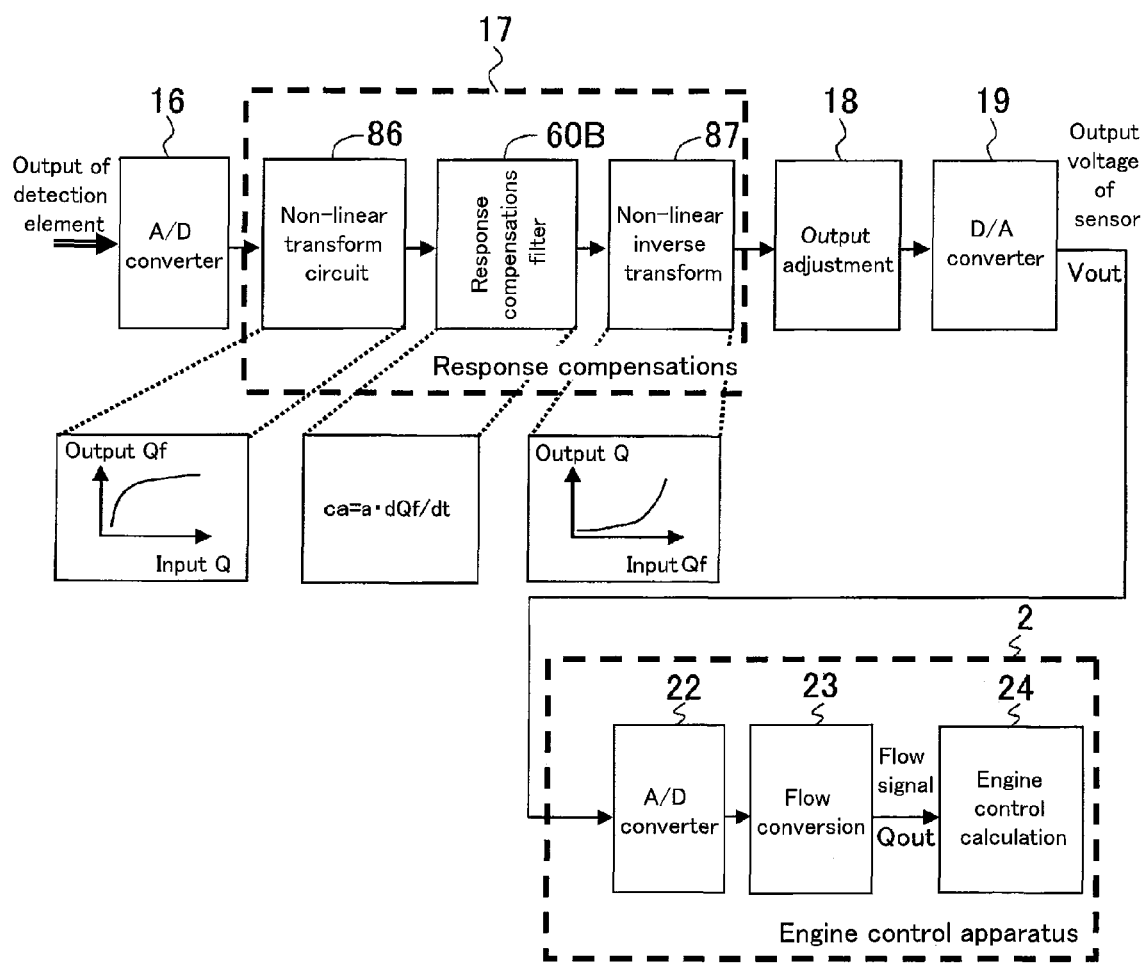
FIG. 12 is a block diagram illustrating a configuration of a characteristic adjusting circuit of a thermal air flowmeter according to a third embodiment and a configuration of an engine control apparatus.

FIG. 12 is a block diagram illustrating a configuration of a characteristic adjusting circuit of a thermal air flowmeter according to a third embodiment and a configuration of an engine control apparatus. Only the difference from the first embodiment will be described below, and a detailed explanation of the same configuration of the third embodiment as the first embodiment is omitted.

The difference of the present embodiment from the first embodiment lies in that a non-linear transform circuit (non-linear transform means) 86 used to transform the detected waveform of the detected flow into a non-linear form is arranged in a stage preceding the response compensations filter 60B and in that a non-linear inverse transform circuit 87 used to perform inverse transform is arranged in a stage following the response compensations filter 60B.

Firstly the non-linear transform circuit 86 multiplies the value of the detected flow Q by a transform factor dependent on the value of the detected flow Q (that is, a transform factor varying according to the detected flow Q), whereby the value of the detected flow Q is transformed into a non-linear form. More specifically, the transform factor is set so that, as the value of the detected flow Q becomes greater, the value (>1) of the transform factor decreases; thus the detected flow Q is converted to Qf.

As a result, the curve characteristic of waveform of the detected flow Q is converted so that, as the detected flow Q becomes higher, the variation of flow decreases; thus the converted detected flow Qf has a characteristic in which the characteristic curve inputted in the response compensations filter 60B varies more in low flow, but varies less in high flow.

Subsequently, the response compensations filter (correction value calculating means) calculates the flow correction value ca based on the temporal variation (dQf/dt) of the converted detected flow Qf. Due to the above described conversion (calculation for the response compensations filter) of the variation (dQf/dt) by the non-linear transform circuit 86, a greater flow correction value ca is provided in high flow than in low flow, and a greater amount of compensations is made in low flow.

Then, the non-linear inverse transform circuit 87 inverse-transforms the transformed detected flow Qf into the detected flow Q, and the output adjustment calculating circuit (flow correction means) 18 corrects the detected flow Q based on the flow correction value ca.

When the above described configuration is used, also, the response compensations value can be varied according to the value of flow by use of a relatively simpler configuration, so that an advantageous effect is achieved which allows reduction of detection error during flow pulsation.

Fourth Embodiment

Figure 13:
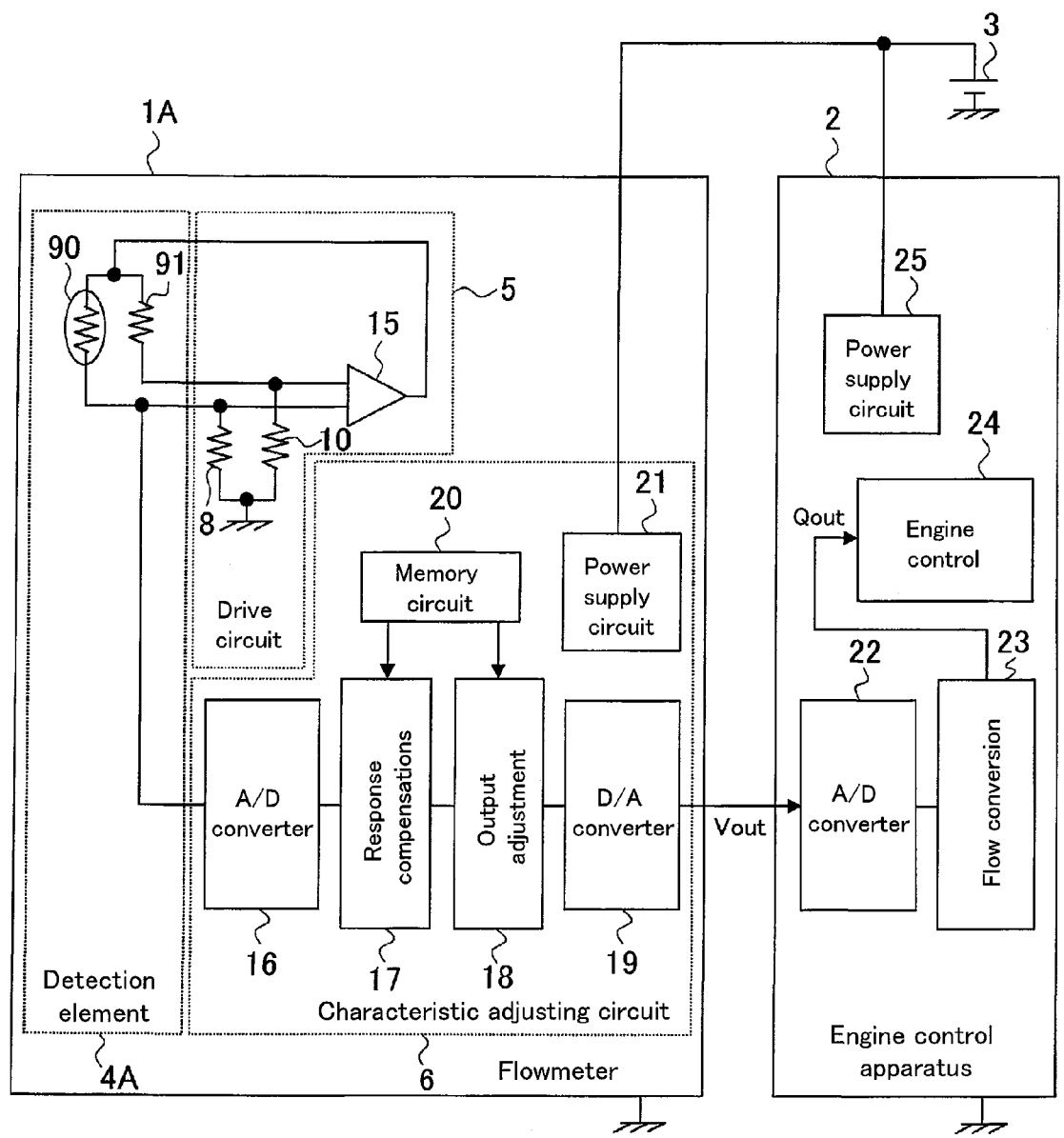
FIG. 13 is a view illustrating a configuration of an air flow measuring system with a thermal air flowmeter according to a fourth embodiment.

FIG. 13 is a view illustrating a configuration of an air flow measuring system with a thermal air flowmeter according to a fourth embodiment. The difference of the thermal air flowmeter illustrated in FIG. 13 from the first embodiment lies in the configuration of the flow detecting element. Only the difference from the first embodiment will be described below, and a detailed explanation of the same configuration of the fourth embodiment as the first embodiment is omitted.

A flow detecting element 4A of a thermal air flowmeter 1A according to the present embodiment does not include the bridge circuit 45 of the first embodiment. A heat-generating resistor 90 and an air temperature detecting resistor (temperature-sensitive resistor) 91 are used; heating control is performed based on the output value of the air temperature detecting resistor 91 by the drive circuit 5 so that the heat-generating resistor 90 is higher in temperature by a constant value than an air temperature (fluid temperature), whereby an air flow is detected from the amount of heating current used to compensate for the amount of heat which is lost from the heat-generating resistor 90 according to the air flow. The thermal air flowmeter according to the present embodiment cannot detect a direction of flow.

Figure 14:
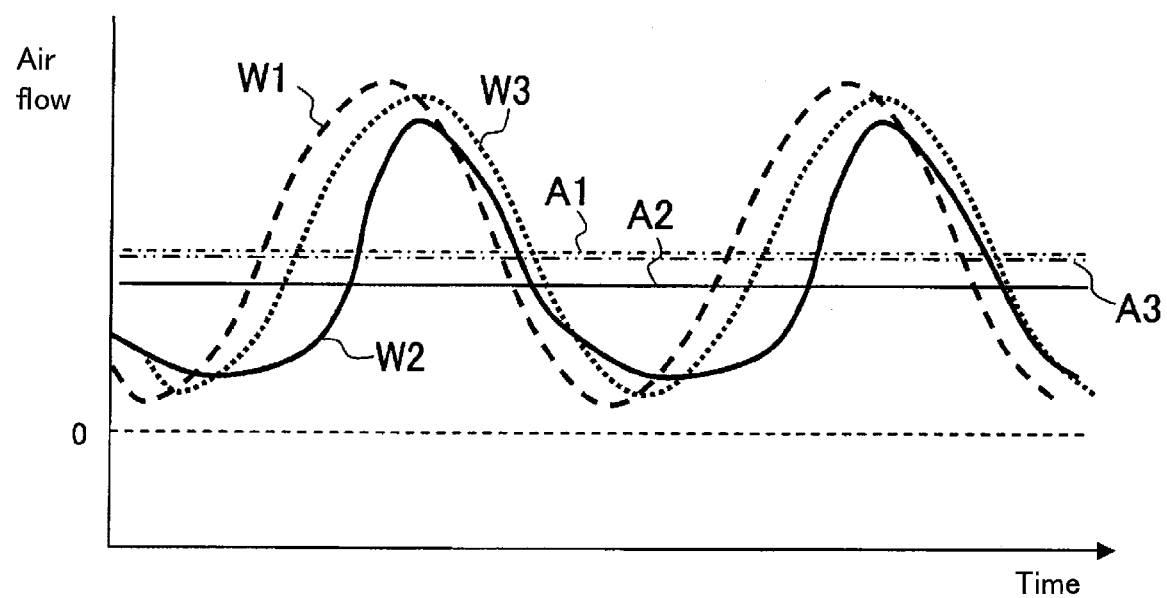
FIG. 14 is a waveform chart when the thermal air flowmeter illustrated in FIG. 13 is used in a state where the thermal air flowmeter is actually mounted in an engine.

When the thermal air flowmeter according to the present embodiment which cannot detect a reverse flow is used, while the real air flow waveform is W1 as illustrated in FIG. 14, the detected signal Qout has a waveform W3 obtained by use of the thermal air flowmeter of this embodiment in which the response is improved and the distortion of waveform is also improved relative to the waveform W2 obtained by use of the conventional thermal air flowmeter. Accordingly, the average value (average flow) A3 of the detected flow is closer to the average value A1 of the real air flow, allowing more accurate flow detection with little error in an actual usage state having a large flow pulsation relative to the average value A2 (not corrected).

The embodiments of the present invention have been described in detail with reference to the drawings. Specific configurations are not limited to these embodiments; an embodiment with design modifications applied thereto without departing from the gist of the invention can also be included in the technical scope of the invention.

In the first embodiment, setting is made using the correction table. However, the flow correction coefficient may be determined using an arithmetic expression composed of a function in which the detected flow and the variation of the detected flow are used as two variables.

The present invention is applicable to apparatuses requiring high reliability, including an apparatus used to detect an air flow and an air temperature as used in, for example, an airplane or ship, and an apparatus used to detect a flow of, for example, hydrogen or the like which is a medium other than air.

What is claimed is:

1. A thermal air flowmeter comprising: a heat-generating resistor which heats fluid; a heating drive circuit which causes current to flow in the heat-generating resistor and thereby controls heating of the heat-generating resistor; and a temperature-sensitive resistor which detects a temperature of the fluid heated by the heat-generating resistor, the thermal air flowmeter detecting a flow of the fluid based on the amount of heat of the fluid heated by the heat-generating resistor, wherein the thermal air flowmeter includes: flow correction value calculating means which calculates a flow correction value based on a variation of the detected flow and on a flow correction coefficient set according to the detected flow; and flow correction means which corrects the detected flow based on the flow correction value.

2. The thermal air flowmeter according to claim 1, wherein the flow correction coefficient is set so that, as the value of the detected flow becomes smaller, the flow correction coefficient increases.

3. The thermal air flowmeter according to claim 1, wherein setting is made so that the flow correction coefficient in a case where the variation of the detected flow is positive, is smaller than the flow correction coefficient in a case where the variation of the detected flow is negative.

4. The thermal air flowmeter according to claims 1, wherein an arithmetic expression for calculating the flow correction value further includes a term of differentiation of second or higher order of the detected flow.

5. A thermal air flowmeter comprising: a heat-generating resistor which heats fluid; a heating drive circuit which causes current to flow in the heat-generating resistor and thereby controls heating of the heat-generating resistor; and a temperature-sensitive resistor which detects a temperature of the fluid heated by the heat-generating resistor, the thermal air flowmeter detecting a flow of the fluid based on the amount of heat of the fluid heated by the heat-generating resistor, wherein the thermal air flowmeter includes: non-linear transform means which transforms a value of the detected flow into a non-linear form by use of a transform factor dependent on the value of the detected flow; flow correction value calculating means which calculates a flow correction value based on a variation of the detected flow transformed; and flow correction means which corrects the detected flow based on the flow correction value.

6. A thermal air flowmeter comprising: a heat-generating resistor which heats fluid; a heating drive circuit which causes current to flow in the heat-generating resistor and thereby controls heating of the heat-generating resistor; and a temperature-sensitive resistor which detects a temperature of the fluid heated by the heat-generating resistor, the thermal air flowmeter detecting a flow of the fluid based on the amount of heat of the fluid heated by the heat-generating resistor, wherein the thermal air flowmeter includes: flow correction value calculating means which calculates a flow correction value by use of an arithmetic expression including a term of variation of the detected flow and a term of differentiation of second or higher order of the detected flow; and flow correction means which corrects the detected flow based on the flow correction value.

* * * * *